US007690415B2

(12) United States Patent
Cheng

(10) Patent No.: US 7,690,415 B2
(45) Date of Patent: Apr. 6, 2010

(54) LIFTING CONTROL APPARATUS FOR WINDOW COVERING

(76) Inventor: Li-Ming Cheng, No. 215, Jiouru 1st Rd., Sanmin Dist., Kaohsiung City (TW)

( * ) Notice: Subject to any disclaimer, the term of this patent is extended or adjusted under 35 U.S.C. 154(b) by 392 days.

(21) Appl. No.: 11/820,566

(22) Filed: Jun. 20, 2007

(65) Prior Publication Data

US 2008/0314531 A1 Dec. 25, 2008

(51) Int. Cl.

*E06B 9/324* (2006.01)
*E06B 9/30* (2006.01)
*F16G 11/02* (2006.01)

(52) U.S. Cl. ................... 160/178.2; 160/170; 24/136 A

(58) Field of Classification Search ................. 160/170, 160/171, 178.2, 84.04, 84.05; 24/115 L, 24/115 R, 136 A See application file for complete search history.

(56) References Cited

U.S. PATENT DOCUMENTS

| | | | | |
|---|---|---|---|---|
| 1,139,595 | A * | 5/1915 | Starr | 24/136 A |
| 2,494,759 | A * | 1/1950 | Hirschy | 24/136 A |
| 4,180,118 | A * | 12/1979 | Vecchiarelli | 160/178.2 |
| 4,250,597 | A * | 2/1981 | Ford et al. | 24/132 R |
| 4,352,386 | A * | 10/1982 | Butler et al. | 160/178.2 |
| 4,842,034 | A * | 6/1989 | Haines | 160/84.04 |
| 4,945,970 | A * | 8/1990 | Marocco | 160/178.2 |
| 5,263,528 | A * | 11/1993 | Patel | 160/178.2 |
| 5,904,198 | A * | 5/1999 | Huang | 160/168.1 R |
| 6,003,217 | A * | 12/1999 | Graves et al. | 29/24.5 |
| 6,029,734 | A * | 2/2000 | Wang et al. | 160/170 |
| 6,213,188 | B1 * | 4/2001 | Huang | 160/178.2 |
| 6,575,223 | B1 * | 6/2003 | Chung et al. | 160/170 |
| 6,675,861 | B2 * | 1/2004 | Palmer et al. | 160/170 |
| 6,752,195 | B1 * | 6/2004 | Chou | 160/178.1 R |
| 7,000,672 | B2 * | 2/2006 | Nien | 160/172 R |
| 7,096,917 | B2 * | 8/2006 | Ciuca et al. | 160/170 |
| 2005/0205219 | A1 * | 9/2005 | Hsu | 160/170 |
| 2006/0175022 | A1 * | 8/2006 | Cheng | 160/170 |
| 2006/0175023 | A1 * | 8/2006 | Cheng | 160/170 |
| 2006/0237144 | A1 * | 10/2006 | Cheng | 160/84.04 |

* cited by examiner

*Primary Examiner*—Katherine W Mitchell
*Assistant Examiner*—Jaime F Cardenas-Garcia
(74) *Attorney, Agent, or Firm*—Muncy, Geissler, Olds & Lowe, PLLC

(57) ABSTRACT

A window covering lifting control apparatus includes a holding unit, a locating set and a pushbutton. The holding unit has a first spacer and a second spacer formed thereon that are spaced from each other. The spacers have two slots inclining downwards. The first spacer has a strut on one side to be coupled with a spring on an outer side. The locating set includes two gears, two locating rods, two locating heads and a spring assembly to hold the two gears between the spacers. The pushbutton is movably coupled on the strut of the holding unit to control movement of the two gears in the slots. The window lifting control apparatus can be installed in a lower elongated member to control retraction upward or extension downward of the window covering. The two gears of the locating set can engage with and latch a lift cord assembly to provide improved locating effect.

10 Claims, 15 Drawing Sheets

LIFTING CONTROL APPARATUS FOR WINDOW COVERING

FIELD OF THE INVENTION

The present invention relates to a window covering lifting control apparatus and particularly to a lifting control apparatus installed on a lower elongated member of a window covering to control retraction or extension of the window covering.

BACKGROUND OF THE INVENTION

Referring to FIGS. 1 and 2, U.S. Pat. No. 6,675,861 discloses a brake for a cordless blind in which a window covering 1 includes a head rail 11, a bottom rail 12 and a blind 13 located between the head rail 11 and the bottom rail 12. The window covering 1 also has a lift cord assembly 14 linking to the blind 13. The bottom rail 12 has a lifting control apparatus 15 which has a button 151 extended from the front side of the bottom rail 12 and a retaining member 152 held in the bottom rail 12 in an extensible manner through a spring 153. The button 151 and the retaining member 152 can clamp the lift cord assembly 14 to harness the movement of the lift cord assembly 14 and the blind 13. Referring to FIG. 3, when in use to retract the blind 13 upwards or extend it downwards, depress the button 151 to compress the retaining member 152 through the spring 153, the lift cord assembly 14 can be moved smoothly between the button 151 and the retaining member 152 so that the blind 13 can be retracted upwards or extended downwards. The window covering 1 can be installed on a door or window of a house to block sunshine and provide decoration purpose.

However in practice the lifting control apparatus 15 mentioned above still has problems, notably:

1. Poor locating: The lifting control apparatus 15 clamps the lift cord assembly 14 through merely the button 151 and retaining member 152. As the general lift cord assembly 14 has to bear the weight of the blind 13, when the weight of the blind 13 is great, the locating effect of the lifting control apparatus 15 on the lift cord assembly 14 is limited. As a result, retracting or extending the window covering 1 is not always easy or smooth.

2. Shorter life span: The function of the lifting control apparatus 15 is mainly achieved through the elastic expansion and compression of the spring 153 to clamp the lift cord assembly 14 between the button 151 and the retaining member 152. As the lift cord assembly 14 has to bear the weight of the blind 13, the spring 153 is subject to a great force. After used for a period of time, elastic fatigue occurs to the spring, and the clamping and locating effect of the button 151 and retaining member 152 diminish. The life span of the brake means 15 suffers.

Referring to FIG. 4, U.S. Pat. No. 6,029,734 discloses a slat-lifting mechanism for Venetian blinds in which a lifting control apparatus 15*a* also provides an elastic extensible function through a spring 153*a* so that two pull cords 14*a* and 14*b* can be clamped between a button 151*a* and a retaining member 152*a*. As the two pull cords 14*a* and 14*b* have to bear the weigh of the blind, the single spring 153*a* also receives a greater force. And elastic fatigue also occurs after used for a period of time. As a result the clamping and locating effect of the button 151*a* and retaining member 152*a* diminish. And the life span of the lifting control apparatus 15*a* also shortens.

SUMMARY OF THE INVENTION

The primary object of the present invention is to provide a window covering lifting control apparatus to solve the problems of poor locating effect and shorter life span occurred to the conventional window covering lifting control apparatus mentioned above.

To achieve the foregoing object the window covering lifting control apparatus of the invention includes a holding unit, an locating set and a pushbutton. The holding unit has a bracket holding two rollers. The bracket has a bottom side with a first spacer and a second spacer formed thereon in a spaced manner. The first spacer has two first slots corresponding to the two rollers. The two first slots are inclined downwards towards two sides of the first spacer. The first spacer has a strut on one side opposing the second spacer between the two first slots to be coupled with a spring on an outer side. The second spacer also has two second slots corresponding to the two rollers that are inclined downwards towards two sides of the second spacer. The locating set includes two gears, two locating rods, two locating heads and a spring assembly consisting of a plurality of springs. The two gears have respectively an axial through hole to be mounted between the first and second spacers corresponding to the slots. The two locating rods have one end forming an expanded end and other end running through the corresponding slots of the first and second spacers and the through hole of the two gears. The two locating heads are fastened to the other end of the locating rods opposing the expanded end. The springs of the spring assembly fasten respectively to the two locating rods and two locating heads. The pushbutton is movably mounted on the strut of the holding unit and has a sleeve coupling with the spring. The pushbutton also has a slant plate on one side facing the locating unit to press one end surface of the two locating heads.

By means of the construction set forth above, the following main functions can be achieved: The window lifting control apparatus can be installed in a lower elongated member of a window covering to control retraction upward or extension downward of the window covering. The two gears of the locating set can engage with and latch the lift cord assembly of the window covering to provide an improved locating effect. Such a structure also can better bear the weight of the window covering. The spring assembly and the springs can jointly bear the force, thereby the life span of the window lifting control apparatus increases.

The foregoing, as well as additional objects, features and advantages of the invention will be more readily apparent from the following detailed description, which proceeds with reference to the accompanying drawings.

DETAILED DESCRIPTION OF THE PREFERRED EMBODIMENTS

Figure 1:
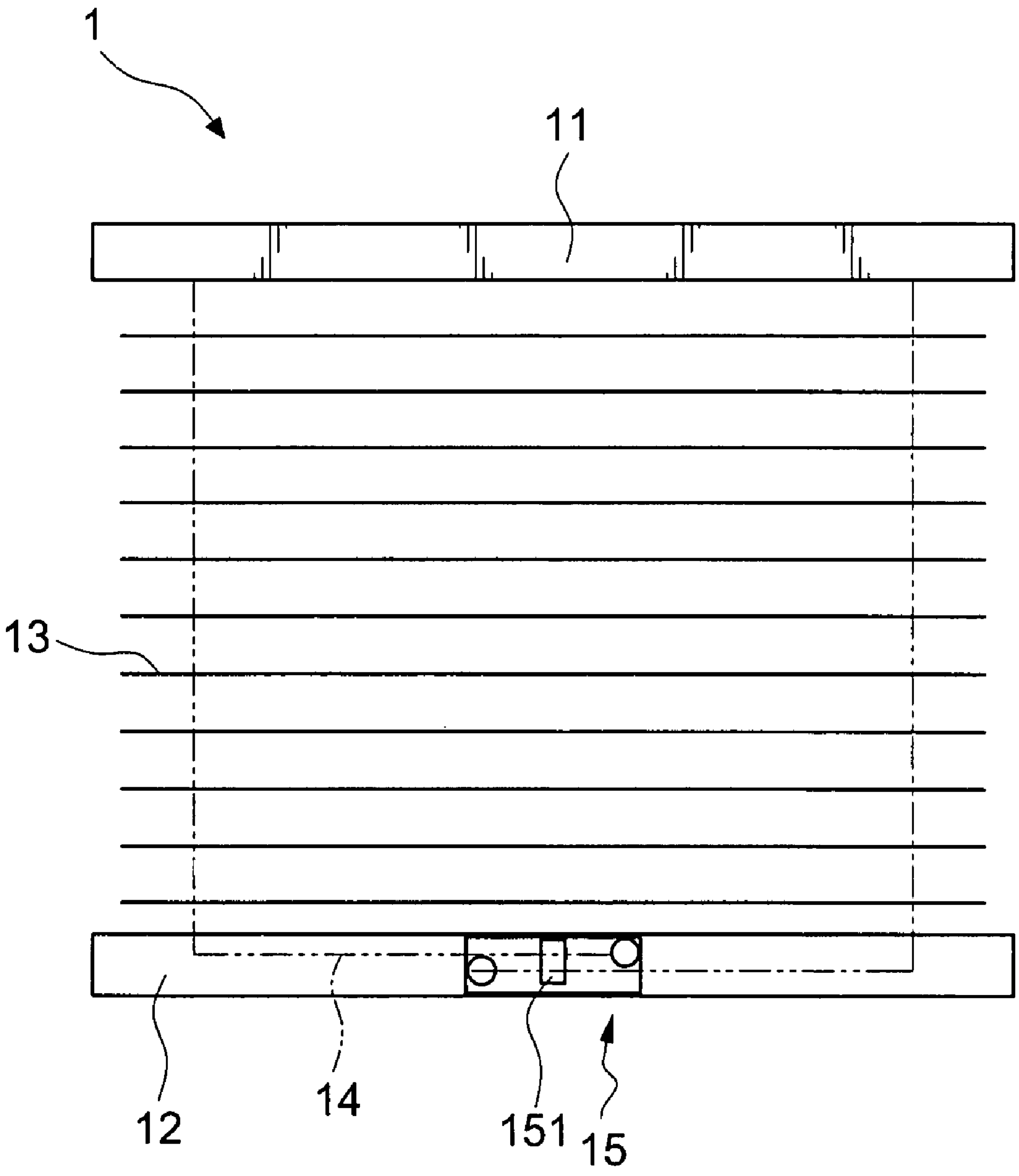
Fig.1 PRIOR ART
FIG. 1 is a front view of a conventional window covering.
Figure 2:
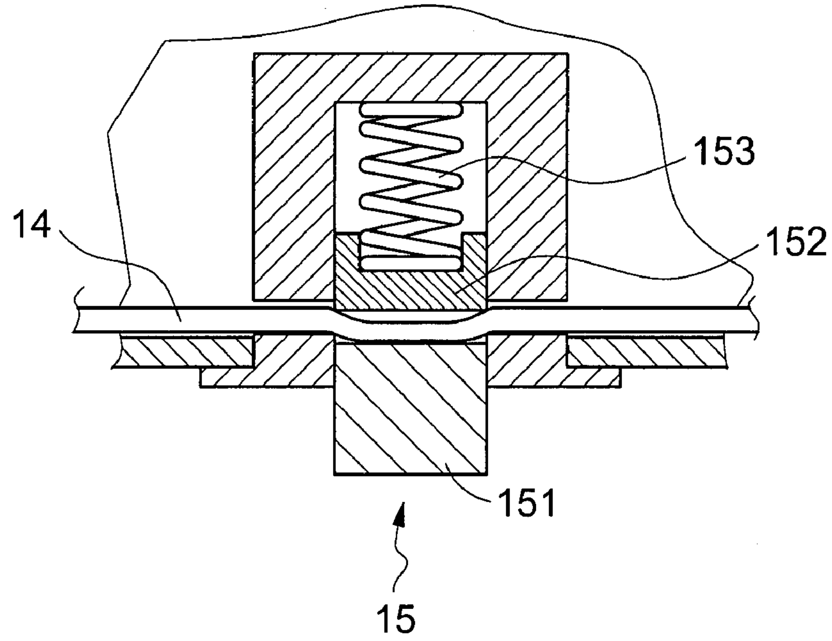
Fig.2 PRIOR ART
FIG. 2 is a sectional view of a lifting control apparatus of a conventional window covering.
Figure 3:
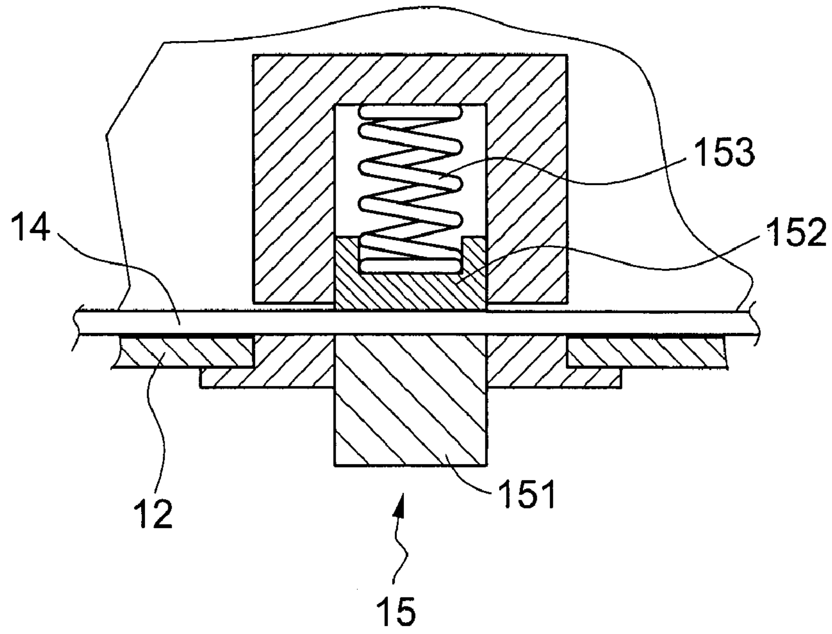
Fig.3 PRIOR ART
FIG. 3 is another sectional view of the lifting control apparatus of a conventional window covering.
Figure 4:
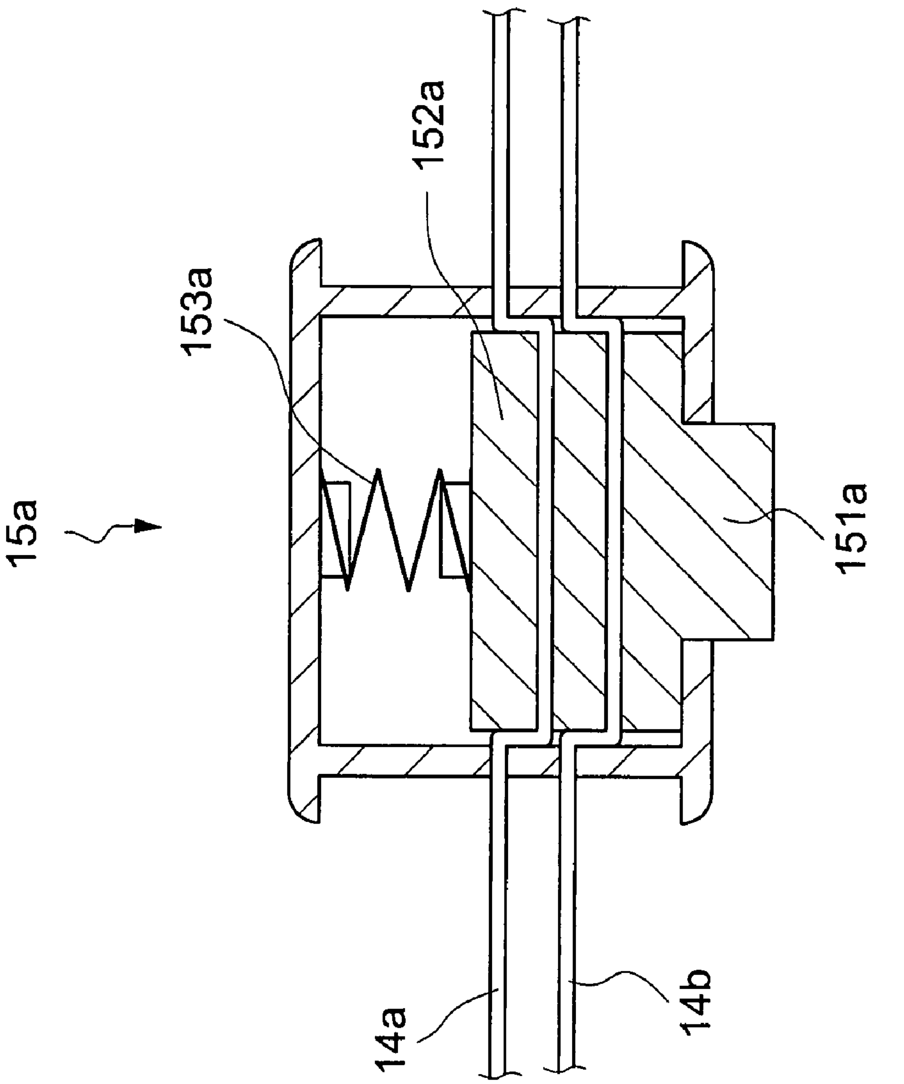
Fig.4 PRIOR ART
FIG. 4 is a front view of another conventional window covering.
Figure 5A:
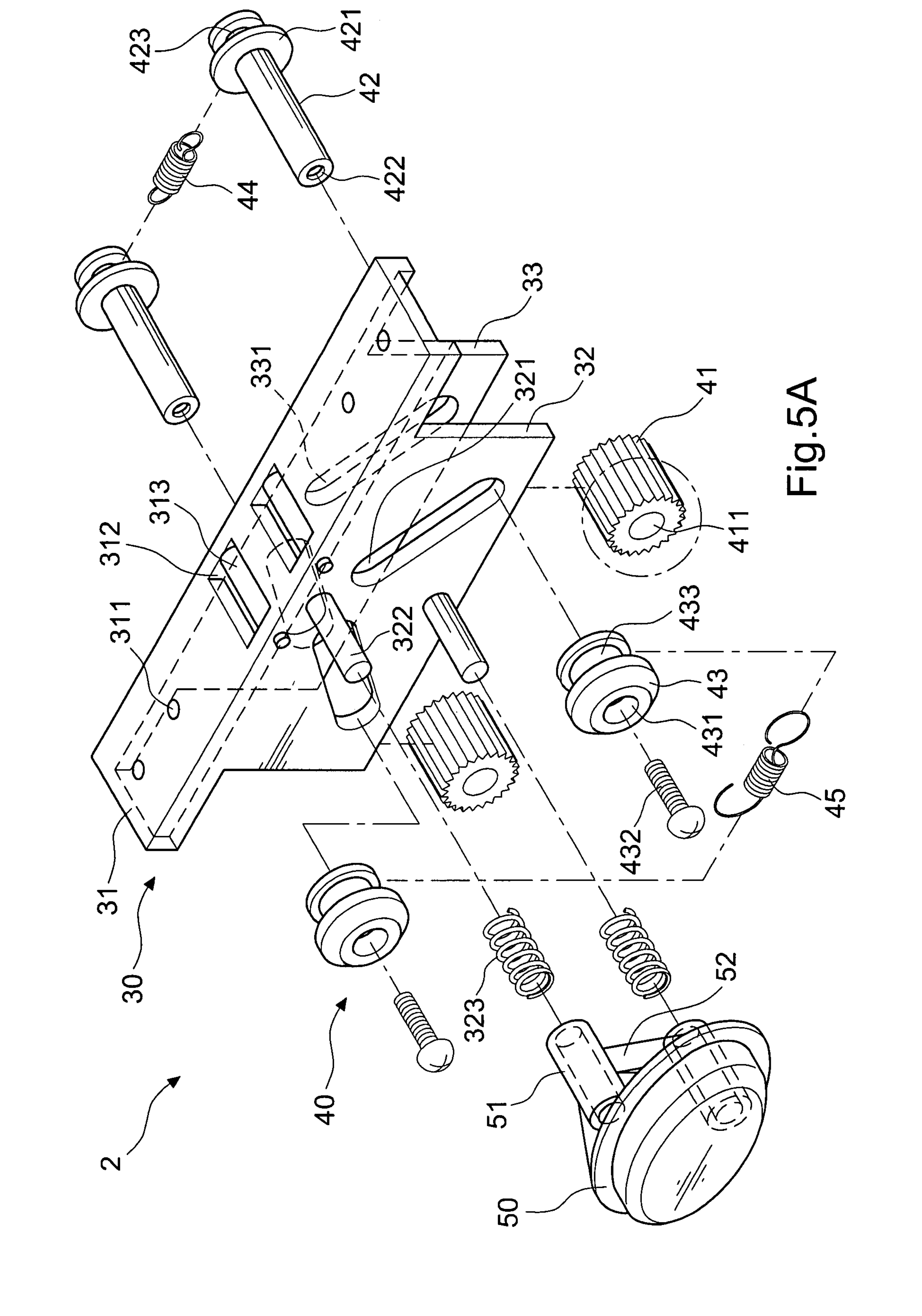
FIG. 5A is an exploded view of the window covering lifting control apparatus of the invention.
Figure 6:
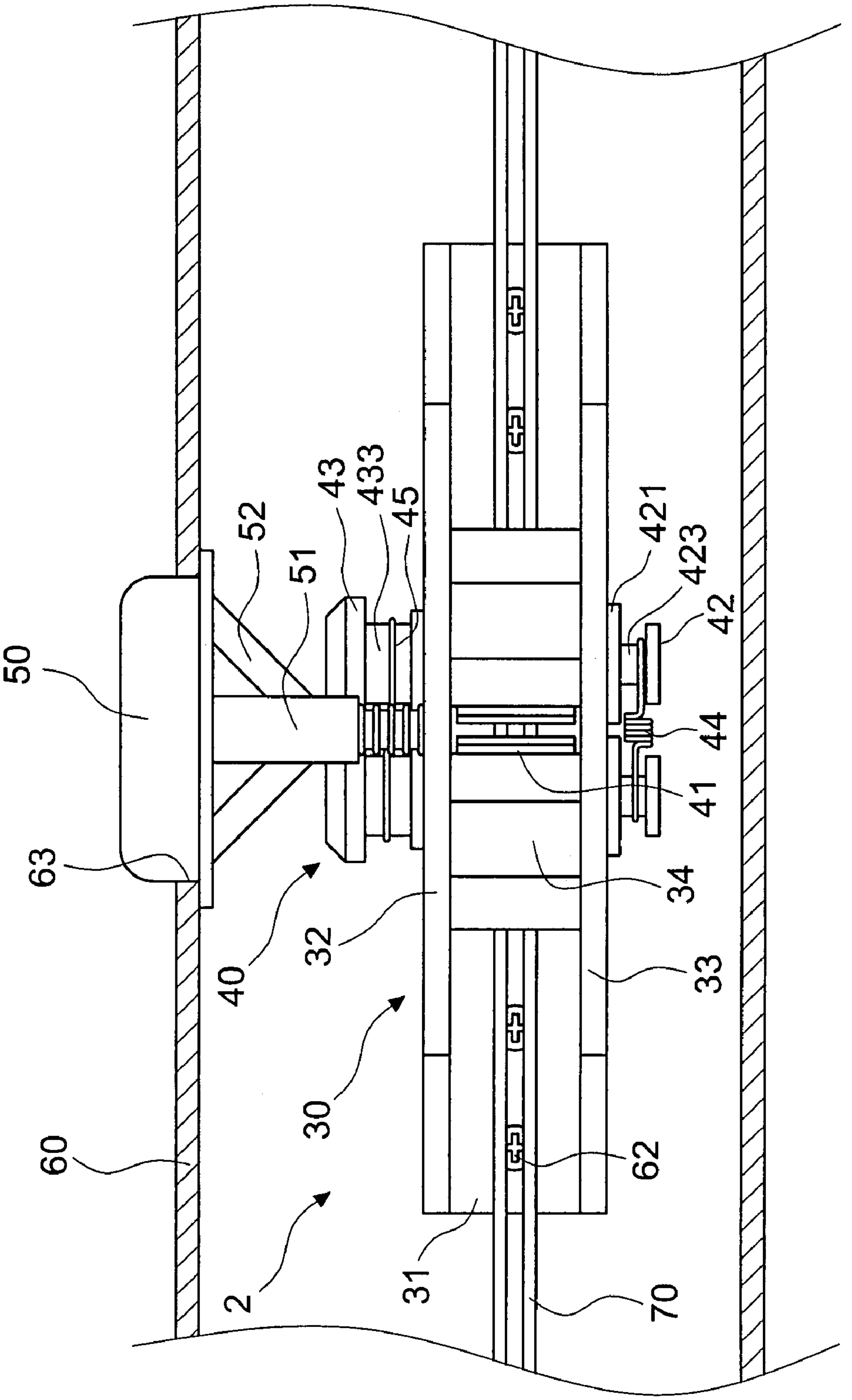
FIG. 6 is a schematic view of the window covering lifting control apparatus of the invention.

Please refer to FIGS. 5A and 6, the window covering lifting control apparatus 2 according to the invention includes a holding unit 30, a locating set 40 and a pushbutton 50.

The holding unit 30 has a bracket 31 which has an aperture 311 and two openings 312 in a middle portion to hold rollers 313. The bracket 31 has a bottom side forming a first spacer 32 and a second spacer 33 in a spaced manner. The first spacer 32 has two first slots 321 corresponding to the two rollers 313. The two first slots 321 are inclined downwards towards two sides of the first spacer 32. The first spacer 32 has one side opposing the second spacer 33 that has a strut 322 formed thereon. The strut 322 is coupled with a spring 323 on an outer side. As depicted in an embodiment shown in the drawings, the number of the strut 322 may be two spaced from each other in an up and down manner. The second spacer 33 also has two second slots 331 corresponding to the two rollers 313 that are inclined downwards towards two sides of the second spacer 33.

Figure 5B:
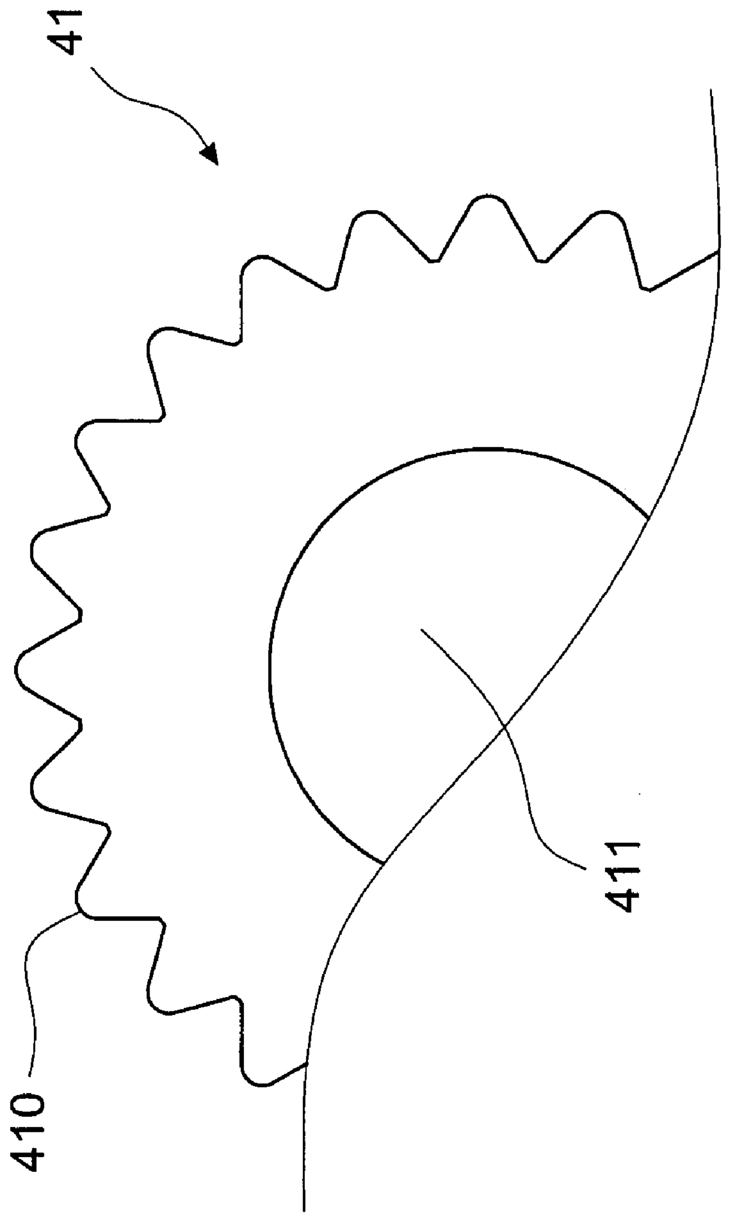
FIG. 5B is a fragmentary enlarged sectional view of the gear in FIG. 5A.
Figure 7A:
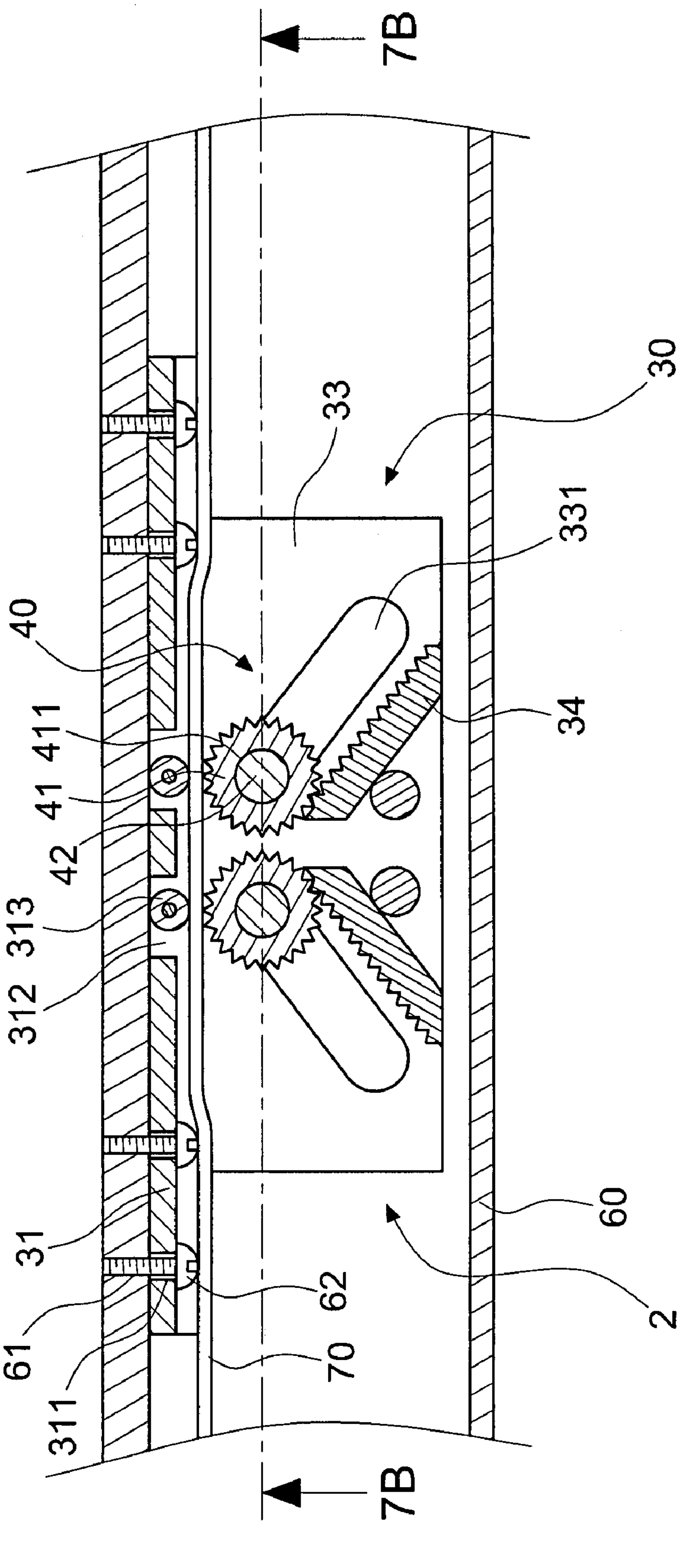
FIG. 7A is a sectional view of the window covering lifting control apparatus of the invention in an assembled condition.
Figure 7B:
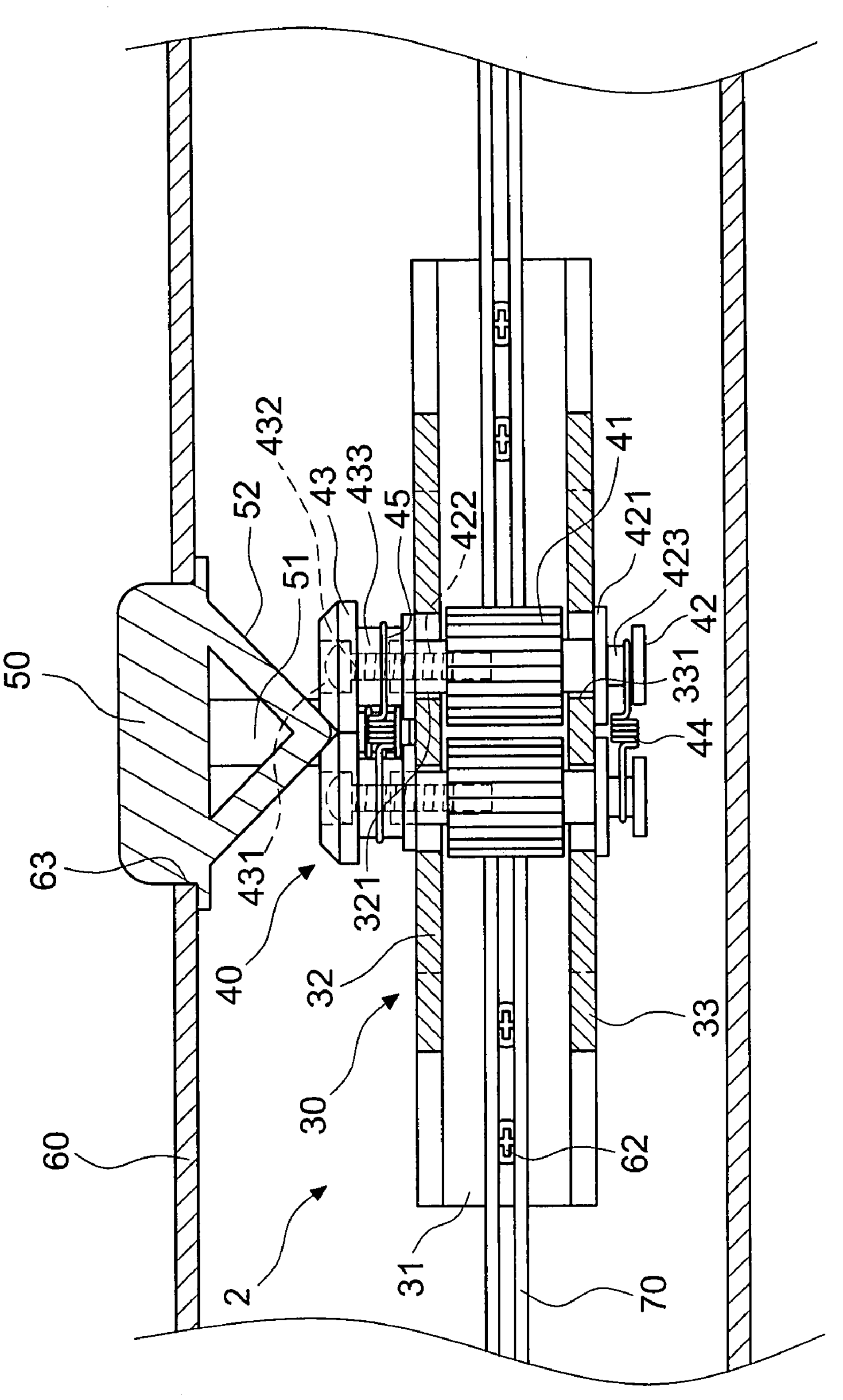
FIG. 7B is a cross section taken on line 7B-7B in FIG. 7A.

Also referring to FIGS. 5B, 7A and 7B, the locating set 40 includes two gears 41, two locating rods 42, two locating heads 43 and a spring assembly consisting of a plurality of springs. The two gears 41 have respectively teeth 410 on the perimeters formed in an arched manner and an axial through hole 411, and are located between the first and second spacers 32 and 33 corresponding to the slots 321 and 331. The two locating rods 42 have one end forming an expanded end 421 and other end running through the corresponding slots 321 and 331 of the first and second spacers 32 and 33, and also the through holes 411 of the two gears 41. The two locating heads 43 are fastened to the other end of the two locating rods 42 opposing the expanded end 421. The spring assembly fastens to the two locating rods 42 and the two locating heads 43 to form an elastic positioning so that the elements of the locating set 40 are movable in the slots 321 and 331 of the first and second spacers 32 and 33, and can be positioned by means of the elastic return force of the spring assembly.

Figure 9:
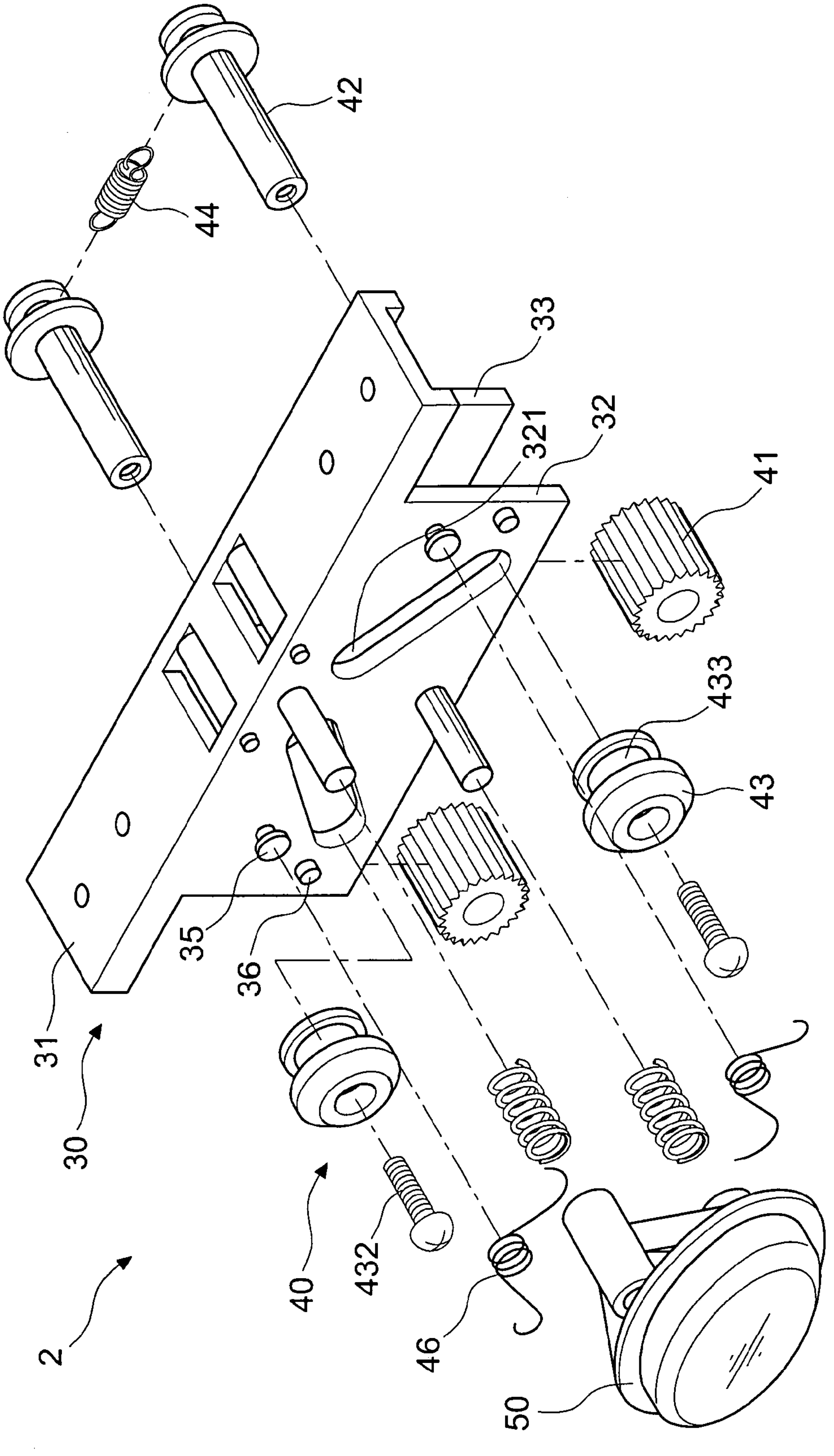
FIG. 9 is an exploded view of another embodiment of the window covering lifting control apparatus of the invention.
Figure 10:
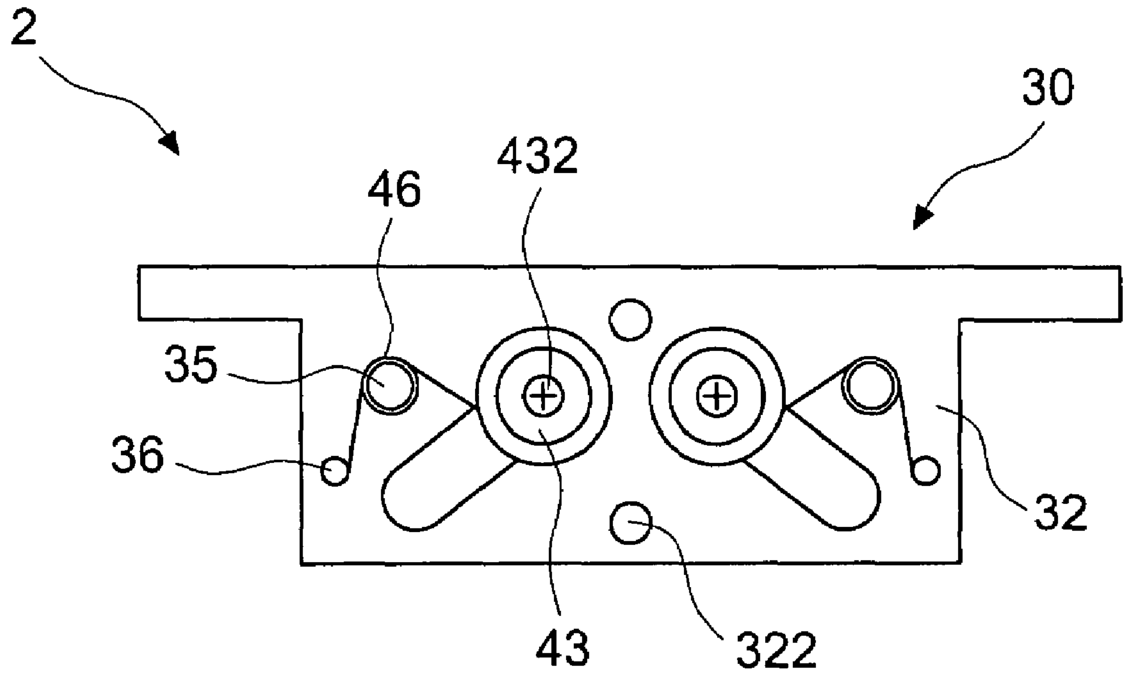
FIG. 10 is a front view of another embodiment of the window covering lifting control apparatus of the invention.

The number and coupling structure of the springs in the spring assembly vary according to different embodiments. In an embodiment shown in FIG. 5A, the spring assembly includes a first extension spring 44 and a second extension spring 45. The first extension spring 44 has two ends fastened respectively to the expanded ends 421 of the two locating rods 42. The second extension spring 45 has two ends fastened respectively to the two locating heads 43. In another embodiment shown in FIGS. 9 and 10 (without the pushbutton 50 in FIG. 10), the spring assembly includes a first extension spring 44 and two torsional springs 46. The first spacer 32 has a pivotal strut 35 and an locating strut 36 at an outer side of the two first slots 321. The first extension spring 44 also has two ends fastened respectively to the expanded ends 421 of the two locating rods 42. The two torsional springs 46 are pivotally coupled on the two pivotal struts 35. One end of the two torsional springs 46 is fastened to the corresponding locating strut 36 and other end is fastened to the two locating heads 43.

The pushbutton 50 is movably coupled on the strut 322 of the holding unit 30 and has a sleeve 51 coupling with the spring 323 so that it is movably mounted on an outer side of the first spacer 32. The pushbutton 50 has one side facing the holding unit 30 that has a slant plate 52 to press an end surface of the two locating heads 43 of the locating set 40.

Referring to FIGS. 5A and 7B, the locating rod 42 has a screw hole 422 at the other end opposing the expanded end 421. The locating head 43 has an opening 431 to receive a screw 432 to fasten to the screw hole 422 to fasten the locating head 43 to one end of the locating rod 42.

Referring to FIG. 5A, the expanded end 421 of the two locating rods 42 also has a journal 423 to be latched by two ends of the first extension spring 44 so that it can be securely held between the two locating rods 42.

Also referring to FIG. 5A, the two locating heads 43 also have a journal 433 in a middle portion to be latched by two ends of the second extension spring 45 so that it can be securely held between the two locating heads 43.

Figure 11:
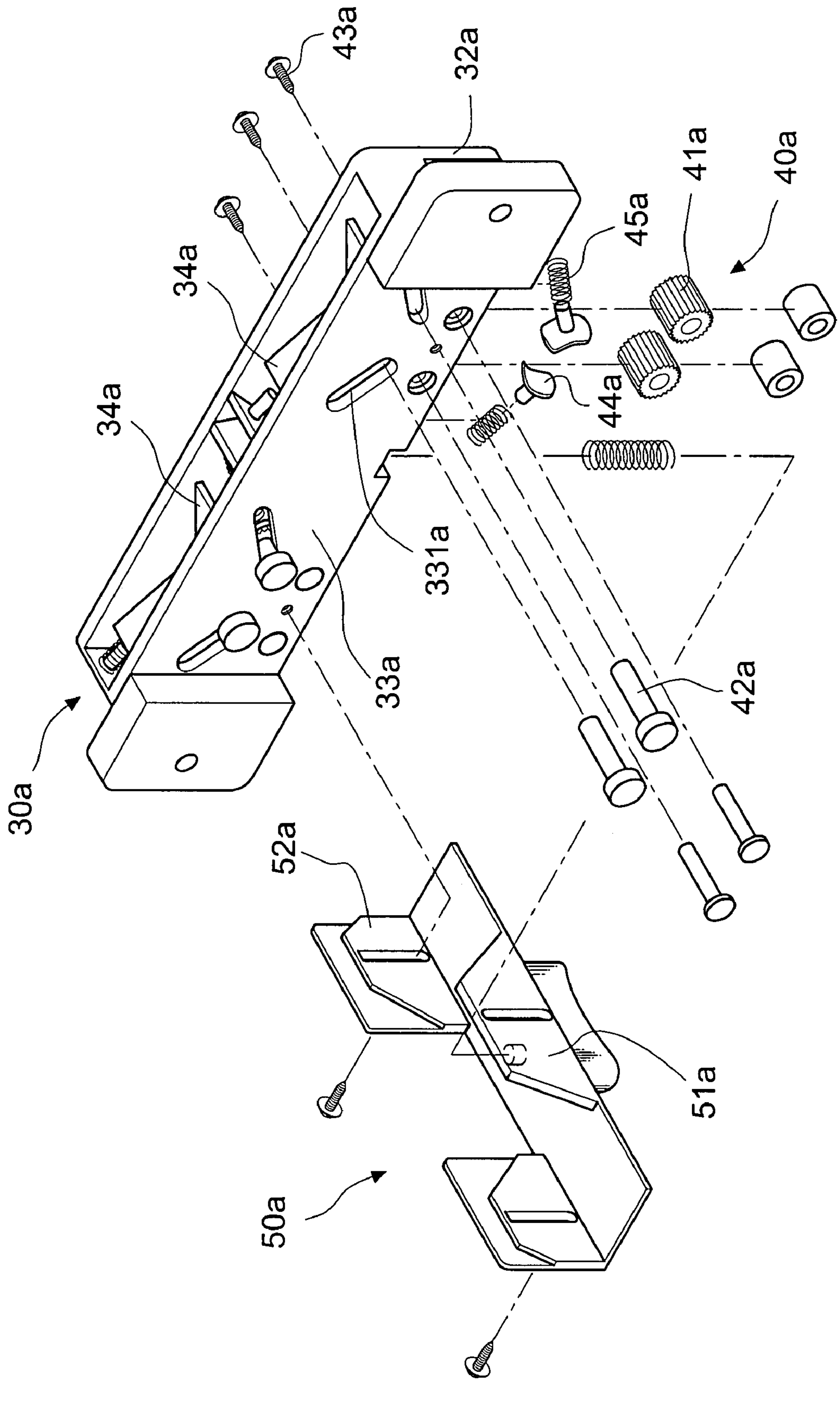
FIG. 11 is an exploded view of yet another embodiment of the window covering lifting control apparatus of the invention.
Figure 12:
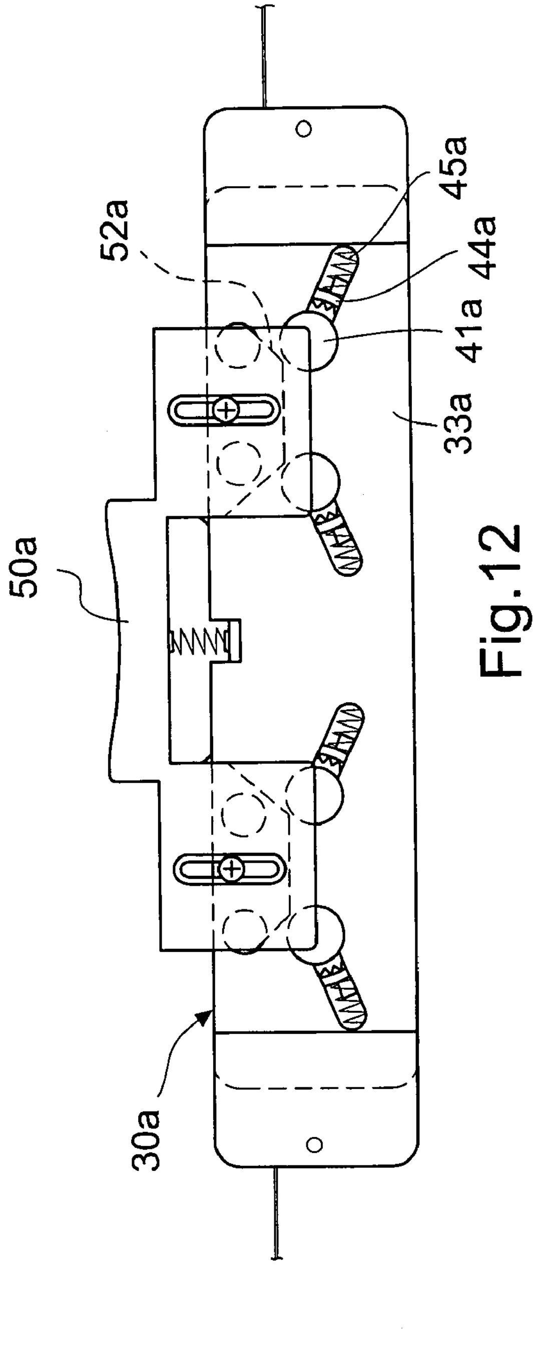
FIG. 12 is a plane view according to FIG. 11.
Figure 13:
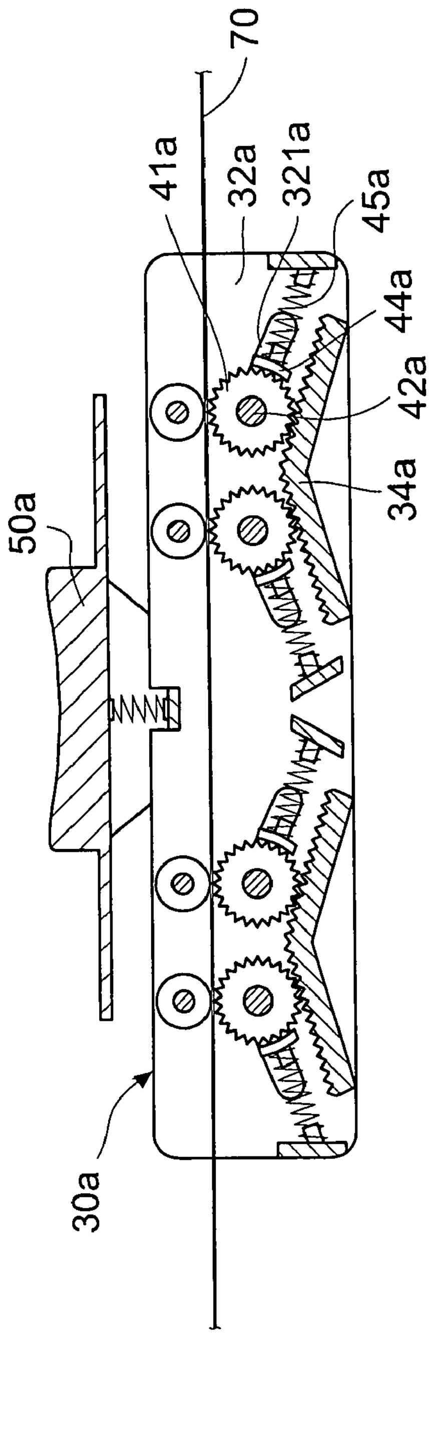
FIG. 13 is a sectional view according to FIG. 11.
Figure 14:
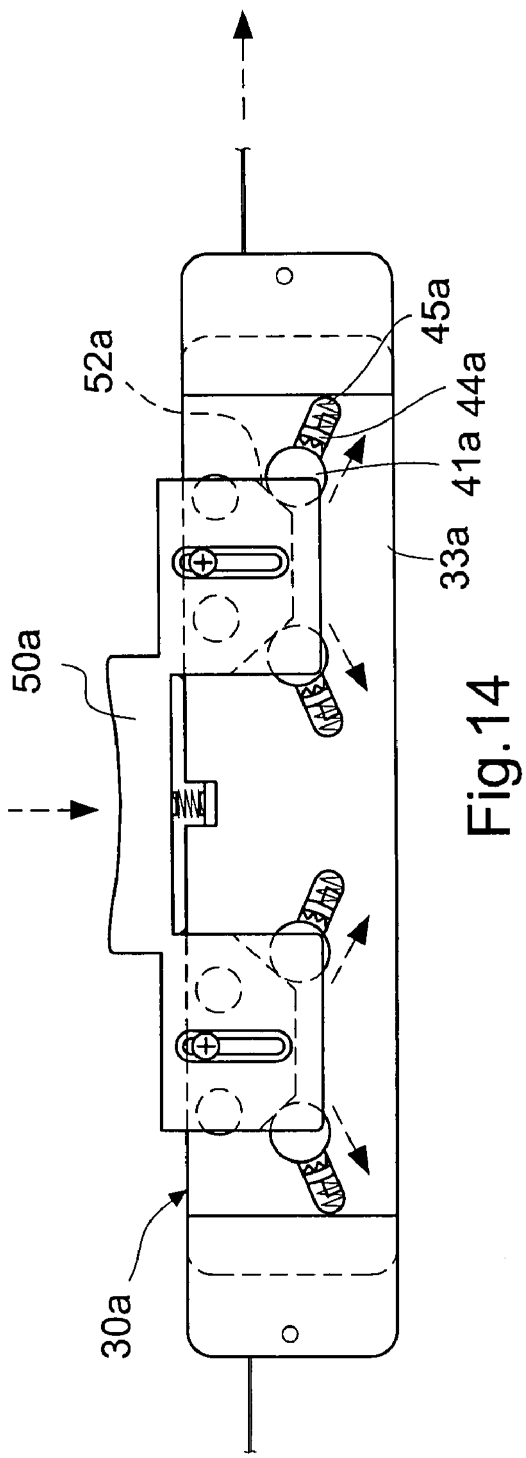
FIG. 14 is a schematic view according to FIG. 11 in a use condition.
Figure 15:
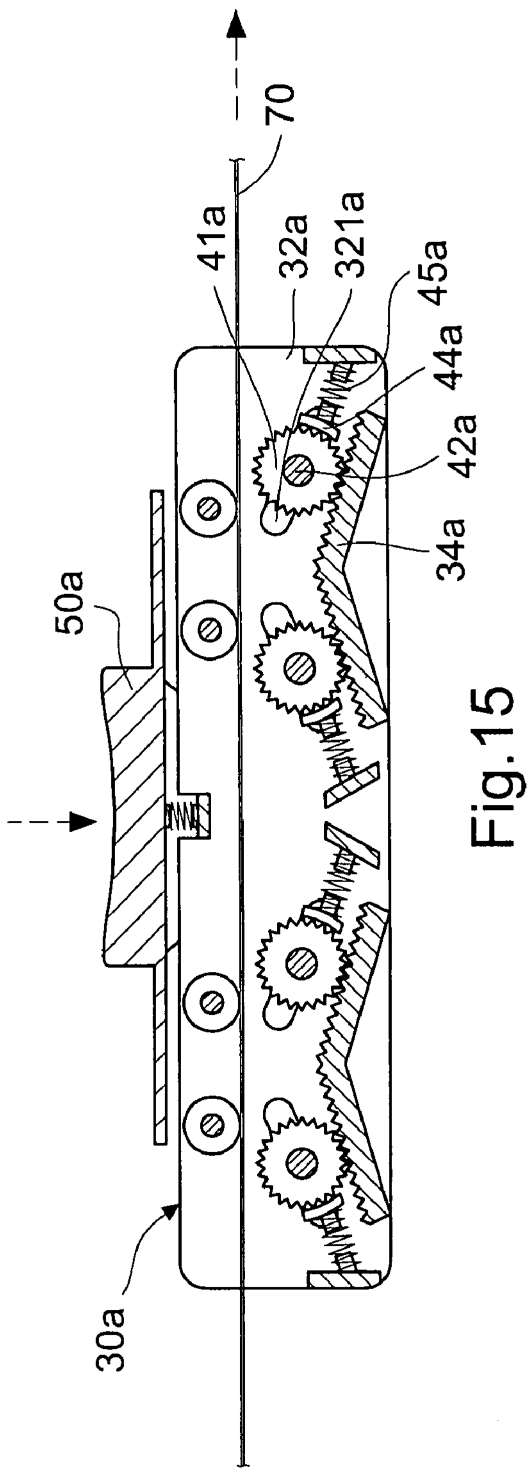
FIG. 15 is a sectional view according to FIG. 11 in a use condition.

Referring to FIG. 7A, a guiding plate 34 is provided between the first and second spacers 32 and 33 to engage with the two gears 41 and is movable in an inclined manner in parallel with the slots 321 and 331 to provide desired guiding for the movement of the two gears 41. In yet another embodiment shown in FIGS. 11, 12 and 13, two opposing guiding plates 34*a* are provided between the first and second spacers 32*a* and 33*a* to engage with the two corresponding gears 41*a* and are in an inclined manner in parallel with the slots 321*a* and 331*a*. The two corresponding locating sets 40*a* have two locating rods 42*a*, two fastening elements 43*a*, two pressing struts 44*a* and a spring assembly 45*a*, and two gear sets 41*a* located between the first and second spacers 32*a* and 33*a*. The pushbutton 50*a* has a lug 51*a* at one end movably coupled on the first spacer 32*a* of the holding unit 30*a* and another end with two sides forming a slant plate 52*a* movably located below the two second slots 331*a* of the second spacer 33*a*. By pushing the pushbutton 50*a* the two slant plates 52*a* push the two gears 41*a* at the same time in the slots 321*a* and 331*a* (referring to FIGS. 14 and 15). The window covering lifting control apparatus thus formed can be installed in the lower elongated member of a window covering to control retracting upwards or extending downwards of the window covering. The two gear sets 41*a* can engage with and latch the lift cord assembly 70 to provide excellent locating effect.

When in use (discussed merely based on the spring assembly consisting of the first and second extension springs 44 and 45), referring to FIGS. 7A and 7B, the window covering lifting control apparatus 2 is installed in a lower elongated member 60 of a window covering. The lower elongated member 60 has a screw hole 61 corresponding to the aperture 311 of the holding unit 30 to receive a screw 62 to fasten the screw hole 61 so that the window covering lifting control apparatus 2 can be fastened securely in the lower elongated member 60. The lower elongated member 60 also has an opening 63 at a front side to hold the pushbutton 50. A lift cord assembly 70 is threaded between the two gears 41 and two rollers 313, and elastically pulled by the first and second extension springs 44 and 45, as shown in FIG. 7A. Thereby the two gears 41 are held in a juxtaposed manner at an upper end of the slots 321 and 331 of the first and second spacers 32 and 33. The lift cord assembly 70 is engaged and latched by the two gears 41 and located between the two gears 41 and two rollers 313. Thereby the window covering attached to the lift cord assembly 70 can be retracted or extended as desired.

Figure 8A:
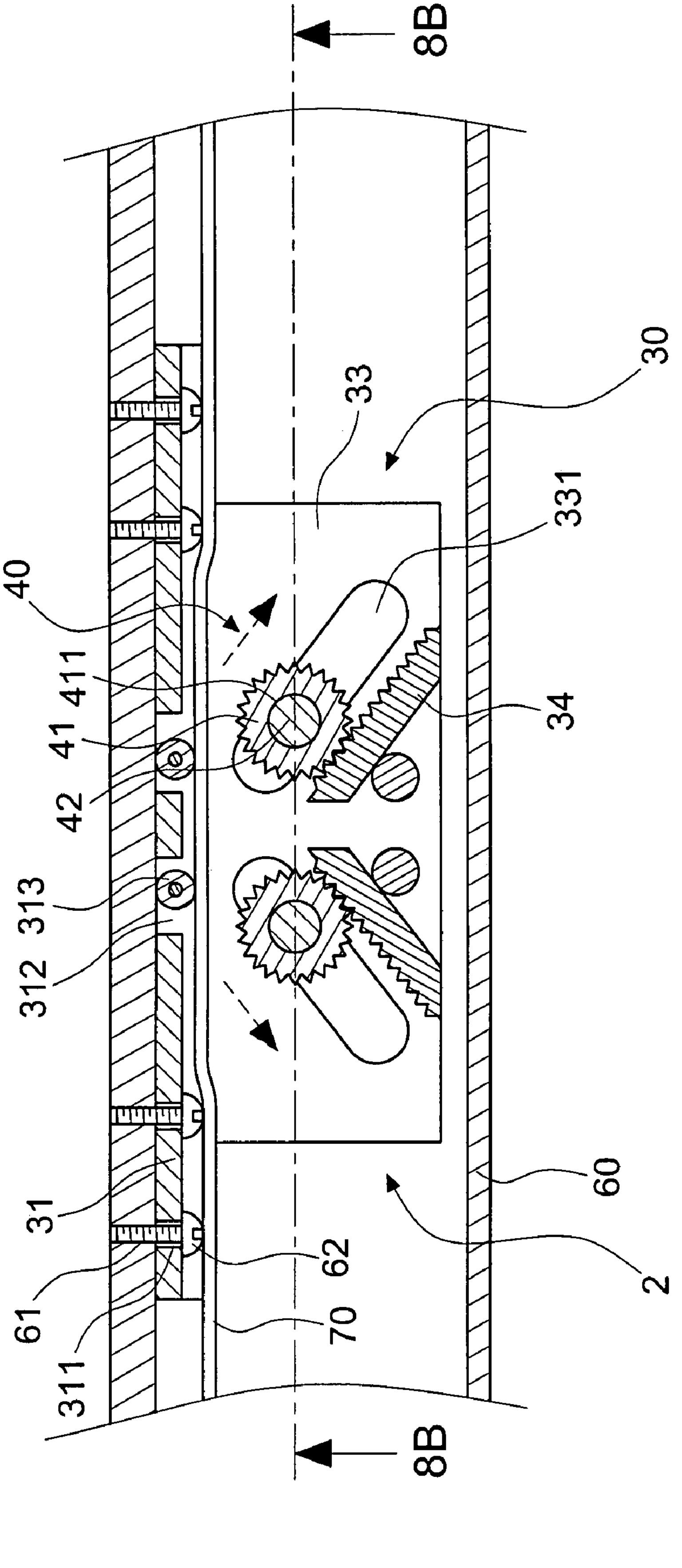
FIG. 8A is a schematic view of the window covering lifting control apparatus of the invention in a use condition.
Figure 8B:
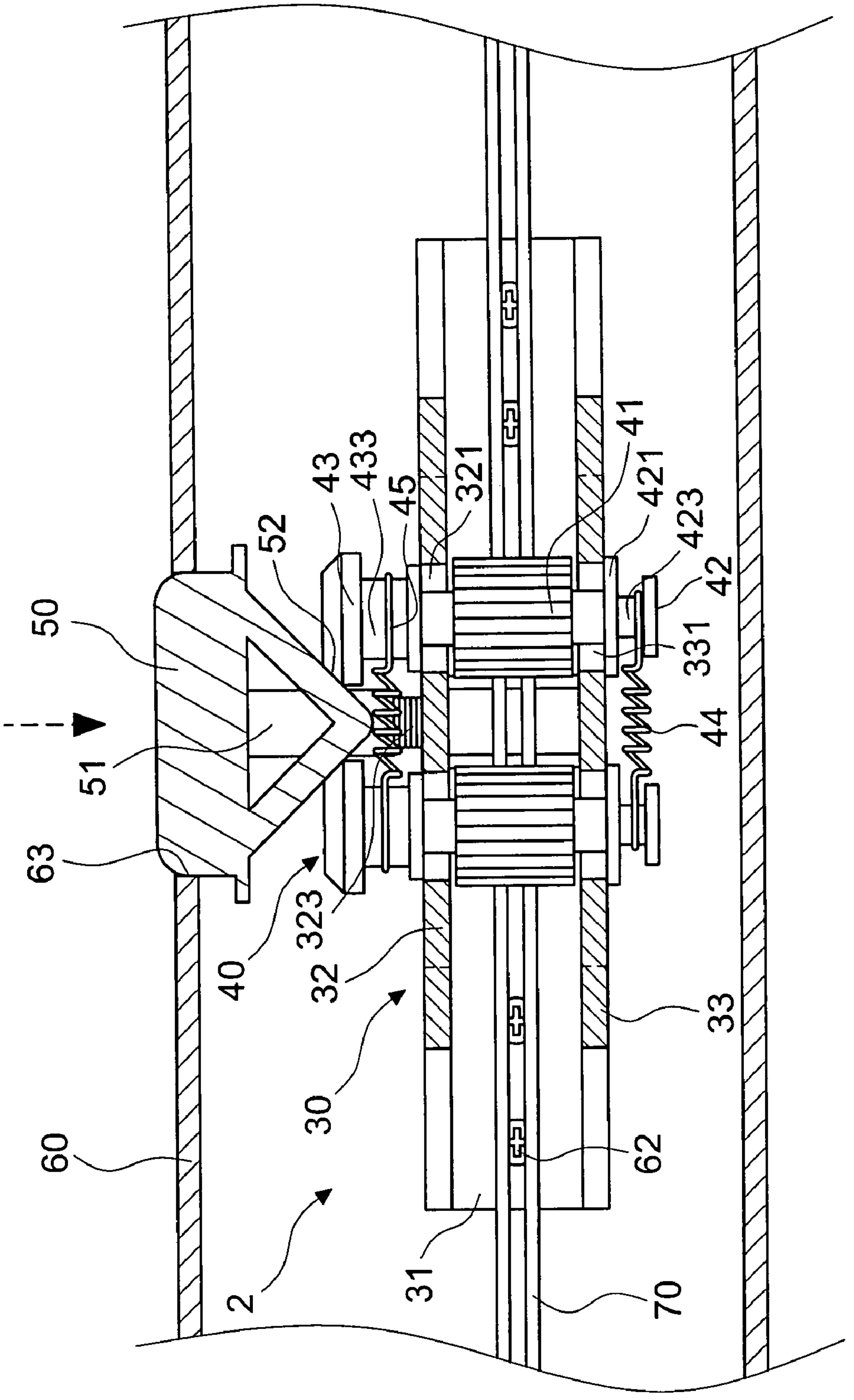
FIG. 8B is a cross section taken on line 8B-8B in FIG. 8A.

Referring to FIGS. 5A, 8A and 8B, when in use to control retraction or extension of the window covering, push the pushbutton 50 in the direction of the holding unit 30 to compress the spring 323; the slant plate 52 forces the two locating heads 43 towards two sides of the holding unit 30; and the two locating rods 42 and two gears 41 are moved in the slots 321 and 331. When the pushbutton 50 is depressed at a desired position, the two gears 41 are moved away from each other and moved downwards, the first and second extension springs 44 and 45 are extended, and the lift cord assembly 70 escapes the two gears 41 and can be moved freely. Hence the window covering can be retracted or extended as desired. After the pushbutton 50 is released, the first and second extension springs 44 and 45 and the spring 323 return under the elastic force (the operation principle of the spring assembly consisting of the first extension spring 44 and two torsional springs 46 also is the same), thus the locating set 40 latches the lift cord assembly 70 again to harness the movement of the window covering.

In short, the window covering lifting control apparatus 2 of the invention has the following main features:

1. Improved locating effect: The window covering lifting control apparatus 2 provides excellent locating effect on the lift cord assembly 70 through engaging and latching of the two gears 41. Retraction upward or extension downward of the window covering can be accomplished easily.

2. Longer life span: As the window covering lifting control apparatus 2 can provide excellent locating effect on the lift cord assembly 70 without moving, the weight of the window covering can be supported effectively. Moreover the spring assembly and spring 323 can jointly bear the force. As a result the life span of the window covering lifting control apparatus 2 increases.

What is claimed is:

1. A window covering lifting control apparatus comprising at least:

a holding unit which has a bracket holding two rollers and a bottom side which has a first spacer and a second spacer formed thereon that are spaced apart from each other; the first spacer having two first slots, corresponding to the two rollers, that are diverging downwardly from the center of the first spacer toward the lateral sides of the said first spacer, and at least one strut mounted on the outer surface of said first spacer that is coupled with a spring; the second spacer having two second slots, parallel to the two first slots, that are also diverging downwardly from the center of the second spacer toward the lateral sides of the second spacer, also corresponding to said two rollers;

a locating set which includes two gears, two locating rods, two locating heads and a spring assembly having a plurality of springs; the two gears having, respectively, an axial through hole and being mounted between the first spacer and the second spacer in corresponding with said slots, the two locating rods having an expanded end at one end with the other end running through the opposing first and second slots and the through holes of the two gears, the two locating heads being fastened, respectively, to the other end of the two locating rods opposing the expanded end, the springs of the spring assembly fastening, respectively, the two locating rods and the two locating heads; and a pushbutton, which is movably coupled on the strut of the holding unit, has a sleeve coupling with the spring, and a slant plate on the side facing the holding unit to slidingly engage the end surface of the two locating heads.

2. The window covering lifting control apparatus of claim 1, wherein the spring assembly includes a first extension spring and a second extension spring, the first extension spring having two ends fastened to the expanded ends of the two locating rods, the second extension spring having two ends fastened to the two locating heads.

3. The window covering lifting control apparatus of claim 1, wherein the spring assembly includes a first extension spring and two torsional springs, the first spacer having a pivotal strut and a locating strut on one side at an outer side of the first slots, the first extension spring having two ends fastened to the expanded ends of the two locating rods, the two torsional springs being pivotally coupled on the pivotal struts and having one end fastened to the locating strut and another end fastened to the two locating heads.

4. The window covering lifting control apparatus of claim 1, wherein the locating rod has a screw hole on the other end opposing the expanded end, the locating head having an opening to receive a screw to fasten the screw hole.

5. The window covering lifting control apparatus of claim 1, wherein the expanded end of the locating rods has a journal to be latched by the first extension spring.

6. The window covering lifting control apparatus of claim 1, wherein the locating heads have respectively a journal to be latched by the second extension spring.

7. The window covering lifting control apparatus of claim 1, wherein the two gears have teeth on the perimeters that are formed in an arched manner.

8. The window covering lifting control apparatus of claim 1 further having a guiding plate between the first spacer and the second spacer in parallel with the inclined direction of the slots to engage with the two gears.

9. The window covering lifting control apparatus of claim 1, wherein the at least one strut of the holding unit comprises two struts that are spaced apart from each other in an up and down manner.

10. The window covering lifting control apparatus of claim 1, wherein the bracket of the holding unit has an aperture formed thereon.

* * * * *